April 26, 1966 J. T. JOHNSON 3,247,721
SAMPLING OF LIQUIDS
Filed April 16, 1963 4 Sheets-Sheet 3
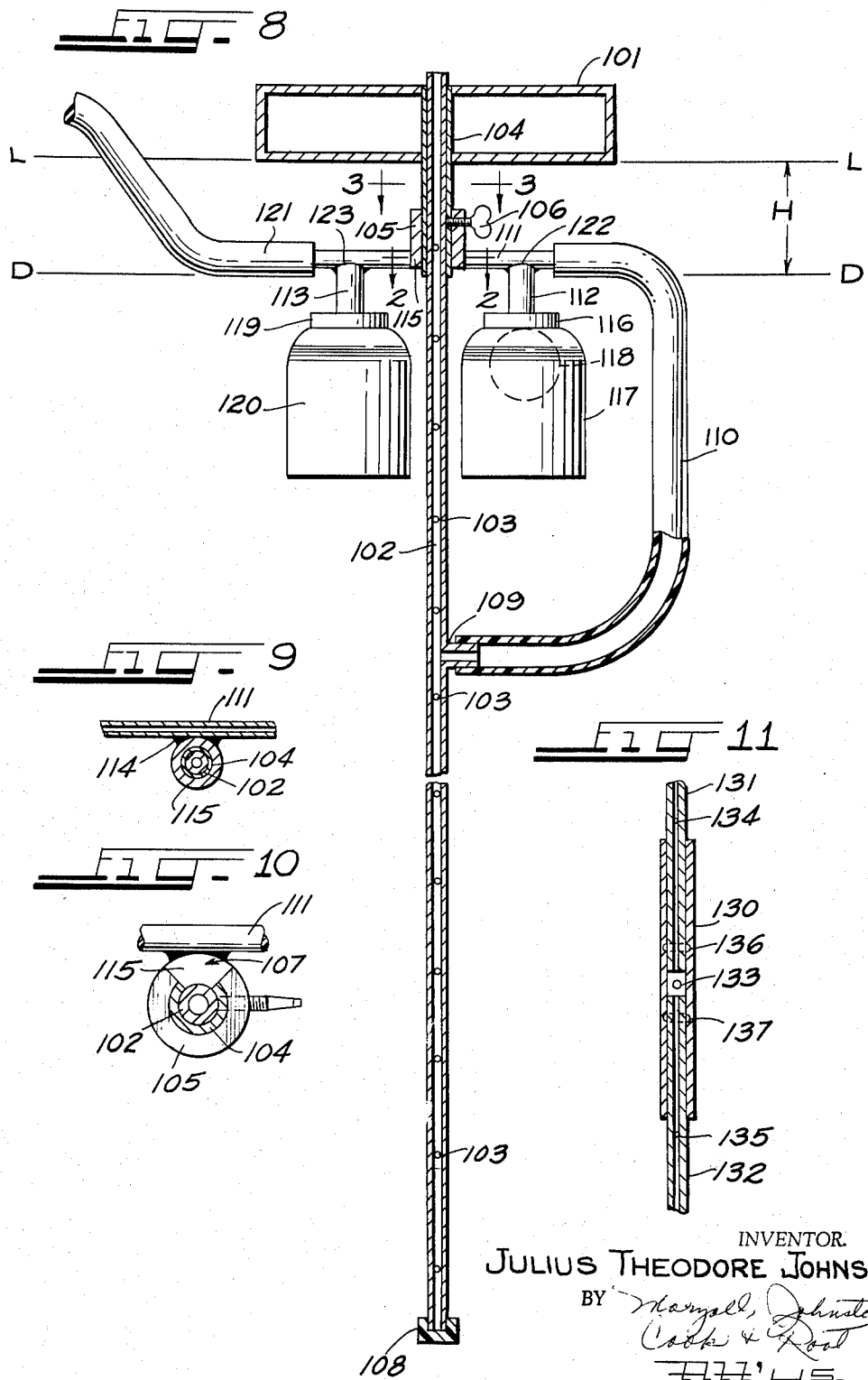
INVENTOR.
JULIUS THEODORE JOHNSON
BY
ATT'YS.

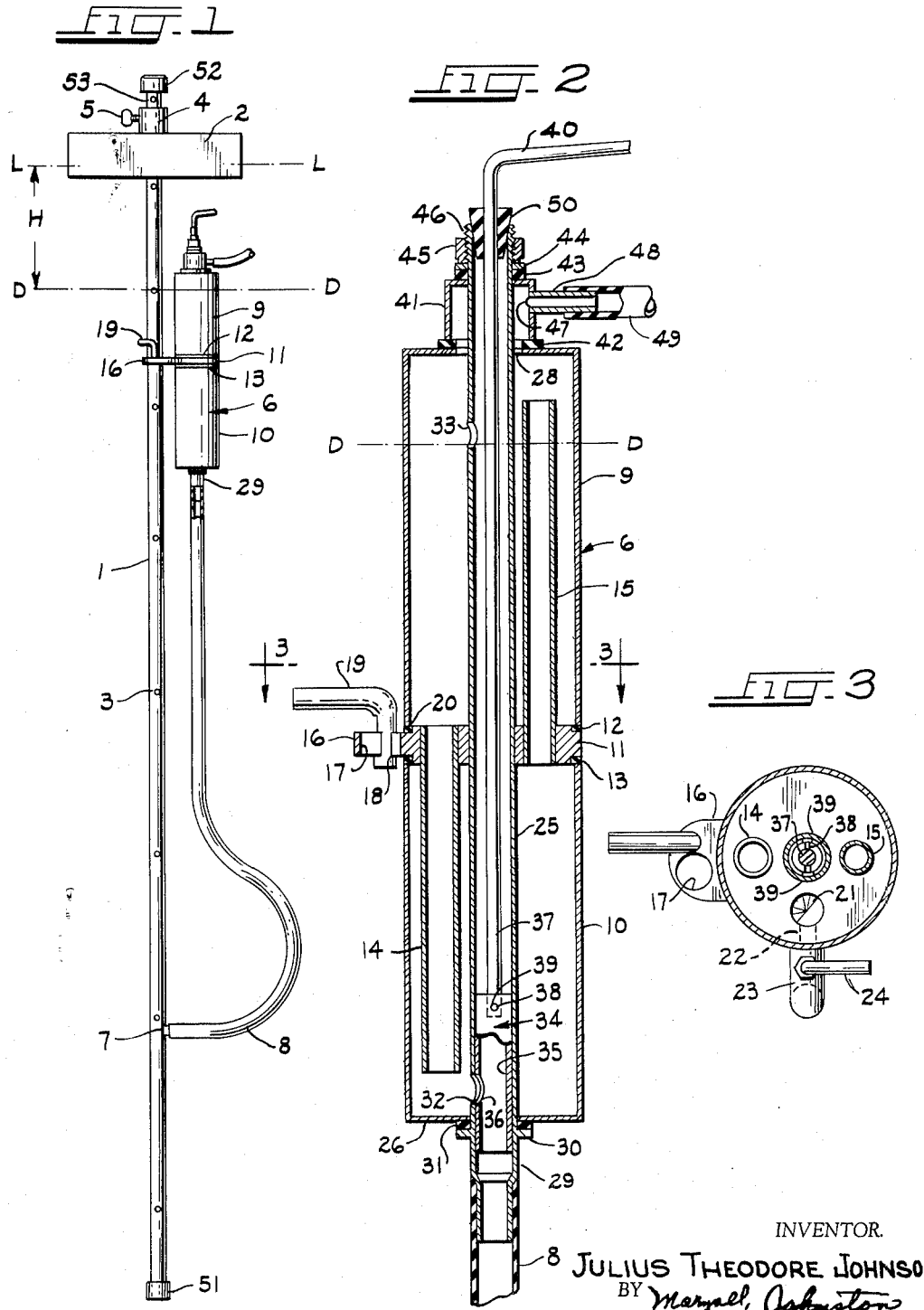

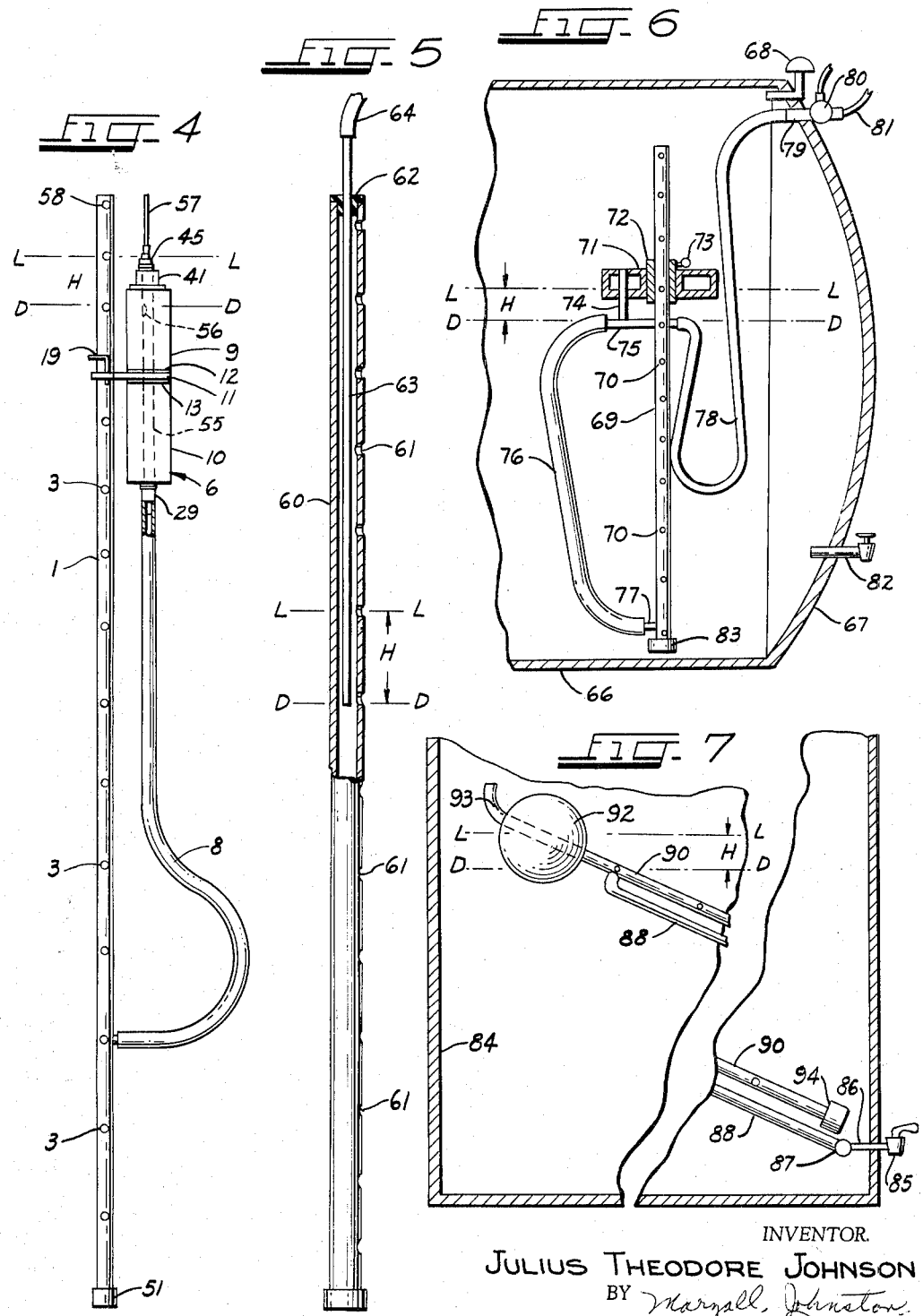

April 26, 1966  J. T. JOHNSON  3,247,721
SAMPLING OF LIQUIDS
Filed April 16, 1963  4 Sheets-Sheet 4
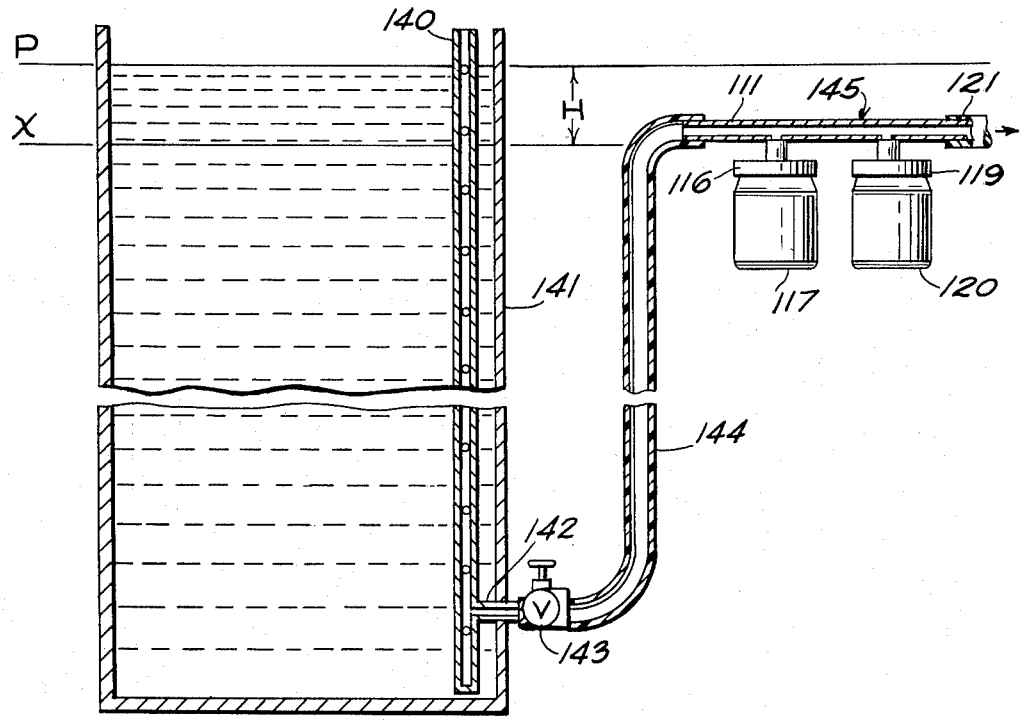
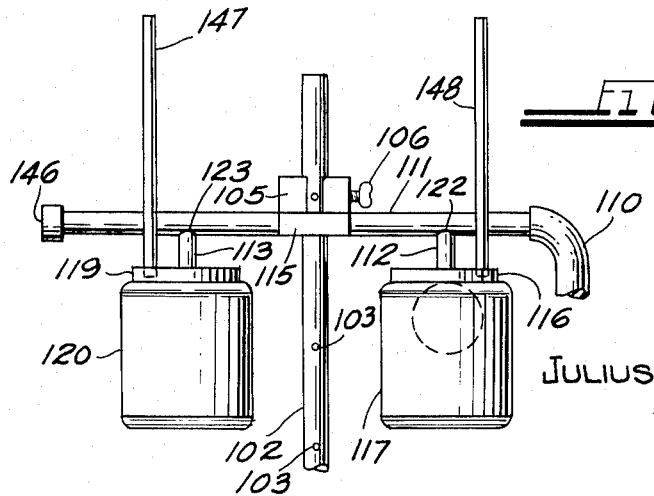
INVENTOR.
JULIUS THEODORE JOHNSON

United States Patent Office 3,247,721
Patented Apr. 26, 1966

3,247,721
SAMPLING OF LIQUIDS
Julius Theodore Johnson, 348 20th St. SE.,
Cedar Rapids, Iowa
Filed Apr. 16, 1963, Ser. No. 273,406
27 Claims. (Cl. 73—421)

This application is a continuation-in-part application of my copending application Serial No. 83,480, filed January 18, 1961, now abandoned, the disclosure of which is incorporated herein.

This invention, in general, relates to sampling a body of liquid and, more particularly, relates to apparatus and procesess which can be used to obtain an average, uniform sample of a liquid which stratifies in layers of different compositions. The invention has particular application to sampling of a body of milk from tanks of various shapes and sizes.

Quick and accurate sampling of a large body of milk in a truck tank or storage tank must be done in a way such that the sample is drawn from a plural number of vertically spaced points in quantities proportionate to the weight or volume of the liquid in the various superposed layers from which the sample is taken. With a tank having vertical side walls, such as an upstanding cylindrical tank, a rectilinear tank and the like, equal volumes of milk may be drawn at equally spaced sampling points inasmuch as the samples are then drawn from layers of approximately equal volume.

However, where the tank in vertical cross-section does not have straight side walls, e.g., a spherical tank, a cylindrical tank lying on its side, a tank ovular or elliptical in vertical cross-section, a hyperbolic tank, and the like, the division of the tank into uniform zones for sampling purposes becomes more complicated. In this case, it becomes necessary to utilize a non-uniform spacing of the points throughout the height of the liquid being sampled or sampling apertures of unequal area with any given aperture being in area the approximate proportion in relation to the total area of all the apertures that the volume of liquid in the layer in which said aperture draws its sample bears in relation to the total volume of the liquid in the tank.

Besides proper spacing of the points from which the sample is drawn, an accurate liquid sampler for liquids having a tendency to stratify into layers of different compositions must either account for or minimize different pressures in different sampling layers due to the increasing fluid head as the sampling depth increases. In accordance with the invention, the pressure difference across each aperture is substantially constant—being in each case approximately the hydropressure of the head in the tank above the point at which the sample is collected in the sampling apparatus.

It is an object of this invention to provide samplers for liquids having a tendency to stratify in layers of different compositions, which samplers will provide substantially accurate average samples of said liquid.

Another object of the invention is to provide accurate liquid samplers of uncomplicated construction.

Still another object of the invention is to provide improvements in processes of sampling liquids which stratify into layers of different compositions.

A still further object of the invention is to provide improvements in vessels in which the sampled liquid is collected.

These, and other objects and advantages of the invention which will be made apparent to those skilled in the art from the following description of the invention, may be attained by the practice of the generic principles of the invention as further illustrated in the preferred embodiments thereof shown in the drawings wherein:

FIG. 1 is a side elevation of one embodiment of a liquid sampler constructed in accordance with the invention;

FIG. 2 is a sectional view along a diametric section of the sample collector of the embodiment of FIG. 1;

FIG. 3 is a sectional view of the collector taken on section 3—3 of FIG. 2;

FIG. 4 is a side elevation of a second embodiment of the invention;

FIG. 5 is a side elevation, partly in cross-section, of a still further embodiment;

FIG. 6 is a view of a diametric cross-section of a cylindrical vessel in which is mounted still another embodiment of the sampling apparatus of the invention;

FIG. 7 is a fragmentary, sectional view of a tank of constant horizontal cross-section with another embodiment of a sampler of the invention therein;

FIGS. 8–10 are, respectively, a side elevation and cross-sections taken on sections 2—2 and 3—3 of FIG. 8 of another embodiment of the invention; and FIGS. 12 and 13 are fragmentary side elevations of other embodiments of the invention.

The liquid sampling apparatus illustrated in FIGS. 1–3 is a floating type apparatus having a sampling tube 1 on which is mounted a hollow, buoyant, liquid-tight float 2. The liquid sampling tube 1 has a plurality of small orifices or apertures extending through a cylindrical wall of the tube 1 and spaced along the length of the tube at predetermined intervals. In the illustrated case, the apertures 3 are of uniform cross-sectional area and are spaced at progressively greater intervals from top to bottom of the tube 1.

The float 2 is mounted on the tube 1 by means of a collar 4 attached to the float 1. A key 5 is threadedly mounted in the collar 4, and its end presses against the wall of the tube 1 to hold the float 2 in any desired adjusted position along the length of the sampling tube.

There is also mounted on the sampling tube 1 at a point below the float 2 a hollow, sample collector vessel 6 in which the liquid sample drawn from the body of liquid being sampled into sampling tube 1 is ultimately collected. The structure of the sample collector vessel 6 is illustrated in detail in FIGS. 2 and 3. The sampling tube 1 has on the lower portion thereof a branch pipe 7 which is connected with the vessel 6 by a tube, preferably flexible tubing 8.

The vessel 6 comprises an upper cylinder 9 and a lower cylinder 10 in axial alignment. The lower cylinder 10 forms a vessel for collecting the initial portion of the sample drawn into the sampling tube 1 and carried to the collector vessel 6 via flexible tubing 8. This chamber is utilized to collect a portion of the liquid prior to the time equilibrium flow is set up in the sampling apparatus. The initial portion of the sample prior to attaining equilibrium flow is not a true sample and, accordingly, this initial portion of the sample must be kept separate from the true sample collected after equilibrium flow is reached. The upper cylinder 9 forms the chamber in which the true sample is collected.

The chambers formed by the cylinders 9, 10 are separated by a divider plate 11 positioned between opposing ends of the cylinders. It has an annular upper shoulder and lower shoulder on which shoulders are seated the rubber seal rings 12, 13 to provide a fluid-tight fit between the plate 11 and the ends of the cylinders 9, 10.

The plate 11 has mounted therein and extending therethrough a liquid flow tube 14 through which liquid is drawn into the upper cylinder 9 and flows by gravity into the lower cylinder 10. A vent tube 15 extending upwardly into the upper cylinder 9 is also mounted in and extends through the divider plate 11. This vent tube provides for the venting of the chamber in the cylinder 10 as it fills with liquid flowing through the tube 14.

There is an ear 16 extending outwardly from one side of the divider plate 11. This ear 16 has a hole 17 in which is mounted the sampling tube 1. The ear 16 has a second hole 18 adjacent the hole 17, the sides of which holes intercept each other. The hole 18 has a locking pin 19 rotatably mounted therein. The leg of the pin 19 which is rotatably mounted in the hole 18 has a shallow groove 20 extending approximately over one-half the circumference of the leg. This shallow groove gives an eccentric surface in the portion of the leg of the locking pin 19 mounted in the hole 17 so that it may be rotated between a position in which the leg of the pin 19 wedges against the sampling tube mounted in the hole 17, e.g., the position shown in FIGS. 1–3. When it is rotated 90° clockwise as viewed in FIG. 3, the sampling tube 1 becomes slidable in the hole 17 of the ear 16 for adjustable positioning of the collecting vessel 6 on the sampling tube 1. It is contemplated that other locking mechanisms may be employed, however.

The liquid collected in the upper cylinder 9 may be discharged from the cylinder 9 by the provision of a recess 21 in the upper face of the plate 11. A radial passage 22 communicates the side of the recess 21 and the outer wall of the divider plate 11, which outer wall has mounted thereon a faucet or pet cock 23 communicating with the end of the passage 22. During the sampling operation, the faucet or pet cock is closed by means of a valve operated by the handle 24.

The collector vessel 6 has a central tube 25 extending axially therethrough. The tube 25 has a relatively tight fit with a hole in the bottom wall 26 of the lower cylinder 10 and with the hole in the divider plate 11. The hole in the top wall of the upper cylinder 9 is somewhat larger than the outer diameter of the tube 25 to provide an annular space 28 to allow the upper cylinder 9 to be filled as hereafter described.

The lower portion of the tube 25 comprises a coupling segment 29 on which is mounted the flexible tube 8. It has a flange 30 between which flange and the bottom wall 26 is provided a rubber seal ring 31. The tube 25 has at least one port 32 located in the side wall thereof near the bottom of cylinder 10. It has at least one port 33 in the side wall thereof in the upper portion of the upper cylinder 9. Fluid flowing into the collector vessel 6 from the sampling tube 1 is discharged through the port 33. During the sampling operation, the port 32 is normally closed by a sleeve valve 34 comprising a hollow cylinder 35, which may have a port 36 therein adapted to be aligned with the port 32. In the sampling operation, these two ports are not aligned so that liquid does not flow out of the tube 25 through port 32.

The sleeve valve 34 can be rotated and/or moved longitudinally in the tube 25 by the provision of a rod 37 attached to a cross bar 38. The ends of the latter extend into diametrically opposite holes 39 inside of the hollow cylinder 35. The rod 37 extends outwardly from the upper part of the collector vessel and may be turned and/or moved axially by finger pressure on the arm 40 of the rod 37.

The purpose of the port 32 and the sleeve valve 34 is to permit the liquid in the lower cylinder of the collector to be drained without disassembling the collector vessel 6. The lower cylinder 10 is drained by either raising the hollow cylinder 35 above the port 32 or by rotating the hollow cylinder 35 until its port 36 aligns with the port 32. The port 36 in the cylinder 35 is applicable primarily to collector vessels in which a pressure source is used to empty the vessel so that pressure may be applied inside the collector to return the unused liquid to the tank being sampled.

There is mounted on the upper wall 27 of the upper cylinder 9 a vent cap 41 which is seated against the rubber seal ring 42 to provide a fluid-tight joint. The cap 41 has a rubber seal ring 43 and a metal washer 44 adhered thereon. When the nut 45 is tightened on the threaded end 46 of the tube 25, the upper cylinder 9, lower cylinder 10 and vent cap 41 are drawn together by the pressure between the flange 30 and the nut 45. The nut 45 is tightened sufficiently to press the seal rings 12, 13, 31 and 42. This also compresses the seal ring 43 to provide a fluid-tight fit between the inner wall of the seal ring and the outside of the tube 25.

The vent cap 41 has mounted thereon and communicating therewith via the opening 47 in its side wall a vent tube 48 on which is mounted a vent tube such as the flexible vent tube 49. This vent tube 49 extends above the surface of the liquid being sampled so that the collector is vented during the sampling operation. If desired, the tube 49 may be connected to a vacuum line or pump.

The upper end of the tube 25 is closed by means of a rubber stopper 50 having an axial hole therethrough in which is tightly fitted the rod 37. This prevents entry of liquid into the collector vessel through the upper end of the tube 25. The lower end of the sample tube 1 is sealed against entry of liquid by the use of a seal cap 51. A similar seal cap 52 may be provided at the upper end of the sampling tube 1 or it may be omitted. If the seal cap 52 is employed, the sampling tube 1 should have a vent hole 53 which remains above the surface of the liquid during the sampling operation. Such vent hole may also be provided in the cap 52.

In operation, the sampling tube 1 with the collector vessel 6 mounted thereon is floated in the body of liquid to be sampled. The collector vessel 6 is positioned on the tube 1 so that the port 33 will be at a liquid depth not substantially greater than the distance between the two uppermost sampling orifices 3. For example, if the liquid level is at the line L—L when the sampler is floating, the depth of immersion in which the port 33 is located, designated by the line D—D, should be approximately the distance H.

In order to secure an accurate sample for analysis in a tank containing liquid which stratifies into layers, different compositions, e.g., milk, the amount of liquid taken from each stratum must be proportionate with the amount of liquid in each stratum sampled by each orifice 3. In a gravity flow sampler such as shown in FIGS. 1–3, the point of discharge of the liquid into the collector (the port 33) is set at a fixed distance beneath the surface of the liquid. For the best sample, this distance should not be substantially greater than the distance between the orifices 3. If the orifices 3 are spaced at constant distances along the tube 1, e.g., 3 inches, the distance H would be approximately 3 inches for the best sampling. If the sampling tube is constructed for the sampling of liquids in vessel in which the various strata have different volumes, the spacing between orifices is not constant. The distance H preferably is the smallest spacing between the orifices.

In the embodiment of FIGS. 1–3, the flow capacitor of the sampling tube 1, the tube 25, the orifice 33, and the tube 14 is substantially greater than the combined flow capacity of all of the orifices 3. The liquid pressure in the sampling tube 1, the flexible tube 8 and the collector tube 25 up to the port 33 is such that a difference in pressure between the inside and outside of the sampling tube 1 at any point therealong is an amount less than the fluid head of the liquid at the line D—D. This is true because the capacity of the sampling tube 1 is much greater than the flow capacity of the orifices 3 whereby any difference in pressure is negligible when compared to the pressure between D—D and any orifice.

The first portion of the liquid drawn into the sampler will not be in proportion to the amount of liquid in each stratum. Properly proportioned flow through each orifice 3 is not attained until the sampler tube 2 and the tube 25 have both filled to the level D—D. Therefore, the first portion of the liquid sample is separated from the latter portion of the sample by the use of the lower cylinder 10, which first fills with liquid flowing by gravity through the tube 14. When the lower cylinder 10 is filled with liquid, the upper cylinder 9 begins to fill with representative sample. The tube 14 keeps the liquids in the two cylinders from intermixing.

As the sample containers fill, the added weight of the collected liquid will cause the sampling tube to move downwardly a small amount through the liquid so that each orifice 3 moves through a stratum for which it is designed to sample. The float is designed to maintain the sampling orifices 3 in the areas for which they are designed during the sampling operation. These areas for sampling purposes, may be volumes of horizontal strata of the tank, each containing an equal volume of liquid in which case the orifices 3 are of equal size and have equi-distant spacing along the sampling tube 1. The volume of the various strata may be of unequal volume, in which case the orifices 3 may be of equal size but spaced apart at different distances in proportion to the volume of the liquid being sampled from each stratum or may be orifices of constant spacing but different diameters in proportion to the volume of liquid in each stratum.

In sampling tanks of nonuniform, horizontal cross-section, the sampling drawn off from each stratum of liquid can be controlled by one of two methods. In one instance, the sampling apertures or orifices 3 are placed closer together so that they sample a thinner stratum of the liquid where the horizontal cross-sectional area of the tank is greater and a thicker stratum of liquid where the horizontal cross-section of the tank is smaller. By proper adjustment of the distances between the orifices 3, each orifice will sample during a sampling period a stratum in the liquid body which is substantially equal in volume to the volume of stratum which the other orifices sample. For example, in sampling a cylindrical tank lying on its side, the orifices at the middle of the sampling tube will be closer together than the orifices at either end of the sampling tube because the depth of a given fractional volume is much less at the middle of the tank than the depth of the same fractional volume at the top or bottom of the tank.

The other method for sampling proper amounts from each stratum is attained by using orifices in the tube of different cross-sectional areas so that the ratio of area of an orifice 3 at a given point of the tube 1 to the total area of all of the orifices 3 is the same as the ratio of the volume of liquid in the stratum sampled by that orifice during the sampling period to the total volume of liquid in the tank. In this case, the orifices 3 are usually, though not necessarily, equally spaced.

In any sampling operation, it is possible that there is a difference in liquid composition from one end of the tank to the other. In such case, an accurate sample may be secured by placing the sampler with the float maintaining the correct position of the sampler with respect to the surface of the liquid. The vent tube 49 is then used to move the sampler slowly from one end of the tank to the other. Thus, a continuous sample is secured throughout the length of the tank from each stratum. If, in the process of sampling, the sampler operates at an angle to the vertical, as when sampling a tank that is not as deep as the sampler is long, the sampler will still take an accurate sample. The tilting of the sampling tube has the effect of placing the orifices 3 in positions in which each orifice will sample a thinner stratum as long as the tank is of the type for which the sampling tube is designed. This applies primarily to sampling in tanks of uniform horizontal cross-section.

The sampler of FIG. 4 is of essentially the same structure as the sampler of FIGS. 1–3. The sampler of FIG. 4 is one in which the float 2 and the vent tube 49 are omitted. This sampler was designed to be used in a single location in the tank. It is held in the tank, for example, by hand and may be moved slowly downwardly as the sampling operation proceeds so that each orifice will pass through the stratum for which it was designed to sample. Only the upper portion of the sampler of FIG. 4 differs in structure from the sampler of FIGS. 1–3.

Referring to FIG. 4, the tube 35 corresponds with the tube 25 of FIGS. 1–3. It may have the sleeve valve 34 and actuator rod 37, and the corresponding port 32, if desired, or these may be omitted. Tube 55 has an orifice 56 located at the depth indicated by the line D—D at the beginning of the sampling operation. The nut 45 has mounted thereon a vent tube 57 which will remain above the surface of the liquid during the sampling operation for venting the collector vessel 6. The upper end 58 of the sampling tube 1 is also open so that the sampling tube is vented during the sampling operation.

The embodiment of FIG. 5 is a sampling tube similar to the sampling tube 1. Instead, however, of utilizing a collector vessel mounted on the tube, it employs a vacuum line for removing the sample from the sampling tube. In this embodiment, the sampling tube 60 is provided with a plurality of sampling orifices 61 along its length in one of the manners heretofore described. A small tube 63, having an outer diameter substantially less than the inner diameter of the sampling tube 60 extends through a cap 62 at the upper end of the sampling tube 60. The tube 63 is connected via a flexible tube or the like to a vacuum source such as vacuum line or pump. The tube is immersed in a liquid having a level on the line L—L and the lower end of the tube 63 extends below the surface of the liquid a distance H to the level indicated by the line D—D, which distance is approximately the distance between the orifices 61. When a vacuum is applied, liquid is drawn into the tube tube 63 and conducted out of the sampling apparatus for collection via tube 64. The liquid level inside the sampling tube is maintained at the level D—D by the vacuum. The tube 63 is small enough with respect to the diameter of the tube 60 so that the sampling tube is vented to the atmosphere through the space between the two tubes and through the orifices 61 above the liquid level L—L. This venting prevents vacuum conditions from existing in the sampling tube below the level D—D. Accordingly, below this level liquid flow into the sampling tube is by gravity flow to the efflux point, the lower end of the tube 63. Accordingly, the head of the liquid at the depth H is the pressure between the outside and inside of the immersed portion of the tube 60 at all of the orifices of the tube, as is the case with the other embodiments of the invention.

The embodiment of FIG. 6 shows a floating sampler in a cylindrical tank. The cylindrical tank comprises a cylindrical wall 66 closed at both ends. In the illustrated case, the end wall is a dome-shaped end wall 67. The tank has provided in the upper portion thereof an air vent 68.

The sampling apparatus comprises a sampling tube 69 with sampling orifices 70 spaced along its length. In this case, the distance between the orifices varies inasmuch as the cylindrical tank varies in cross-sectional area from top to bottom with the widest point being at the mid-point. Accordingly, the sampling tube 69 is designed for this tank so that a spacing between orifices is the closest at the mid-point of the tank and the spacing increases progressively in both directions away from the mid-point. The float 71 is held by a sleeve 72 and key 73 in the proper position on the sampling tube 69. When the sampling tube is empty, the float is positioned so that the bottom of the sampling tube is slightly above the bottom of the tank.

There is mounted in the float 71 a tube 74 which carries at its lower end a horizontal tube 75. One end of the tube 75 is connected via a flexible tube 76 with the T-branch 77 located near the lower end of the sampling tube. The other end of the tube 75 is connected by the flexible tubing 78 to a pipe 79 mounted in the upper end of the tank. The pipe 79 may have a solenoid valve 80 connected therewith, the pipe 79 and its valve 80 connected by a tube 81 to a vacuum line or vacuum pump.

Because the tube 74 is a vent for the tube 75, the vacuum system does not effect the gravity flow operation of the sampling tube which operates in the manner heretofore described with respect to other embodiments of the invention. The liquid flows into the sampling apparatus through the orifices 70 at a pressure approximately equal to depth D—D of the liquid at which the tube 75 is immersed. The liquid flows out of the T-pipe 77 through flexible tube 76 to the horizontal tube 75. After it flows in the flexible tube 78, the vacuum assists in its removal from the tank for collection.

The lower end of the sampling tube 69 is closed by means of a seal cap 83, while the upper end is open.

If it is desired to sample the tank solely on gravity system, a petcock 82 may be provided in the end wall of the tank near the bottom thereof and the end of the flexible tube 78 may be connected to the petcock.

The embodiment of FIG. 7 is another type of gravity system in which a sampling tube is hingedly mounted in a vertical walled tank 84 having constant horizontal cross-section. The tank has in its side wall near the bottom of the tank a petcock 85, the tube of which extends into the tank. The tube 86 is connected by a hollow pivot joint 87 with a rigid tube 88. The upper end 89 of the tube 88 is mounted on and communicates with the sampling tube 90. The sampling tube 90 has a plurality of equally spaced orifices along its length, designated as 91.

The upper end of the sampling tube 90 has a ball float 92 mounted thereon. A vent tube 93 for the sampling tube 90 extends through and projects outwardly from the ball float 92. The lower end of the sampling tube 90 is closed by a seal cap 94.

The flow of liquid into the sampling tube 90 is the same as with other embodiments of the invention. The sample of fluid is discharged from the tube 90 at the level D—D. This sampling tube will sample accurately in any angular position or in the vertical position, thus enabling the sampling to be conducted with a full or partly filled tank.

The liquid sampling apparatus of FIGS. 8–10 is a floating type apparatus having a hollow, buoyant, liquid-tight float 101 mounted on a vertical sampling tube 102 with a plurality of equally spaced apertures 103 of uniform cross-sectional area provided in the cylindrical wall of the sampling tube 102. The float 101 is mounted on the tube 102 by a sleeve 104 which is attached by fluid-tight joints to the float 101 and also is attached to the inside of the collar 105. The collar 105 has a threaded key 106 threadedly mounted therein, the end of which key extends through the collar 105 and an aperture in the sleeve 104 so that the end of the key 106 can be brought into frictional engagement with the wall of the tube 103 and thus hold the collar, sleeve, and float unit at the desired position along the tube 103. This unit can be moved up and down along the tube 103. Both the collar 105 and the sleeve 104 are shaped as less than complete cylindrical walls to provide the longitudinal opening 107 in their cylindrically-shaped walls to avoid blocking of the apertures 103.

The end of the tube 103 is capped and sealed by rubber cap 108. Intermediate the capped ends of the tube 103 there is a T-branch take-off 109 connected to and communicating with hollow tube 103. One end of a flexible tube 110, e.g., a rubber tube or elastomeric synthetic polymer tube, is slipped over the T-branch and the other end of the flexible tube 110 is connected to a conduit 111 having a pair of T-branches 112 and 113 connected to and communicating therewith. The conduit 111 is mounted on the ring portion 115 of the collar 105 by soldering 114 or other suitable means.

The T-branch 112 has an internally threaded cap 116 in which is threaded the externally threaded neck of the liquid collecting vessel 117. The vessel 117 contains a ball float 118 which closes off the vessel 117 when it has substantially filled with liquid and the ball float 118 rests in the neck of the vessel 117.

The T-branch 113 has an internally threaded cap 119 in which is threaded externally threaded neck of the liquid collection vessel 120. The end of the conduit 111 has a flexible tube 121 fitted thereover. This flexible tube is used to vent the sampler to the atmosphere.

The embodiment of FIGS. 8–10 is used in the following manner to obtain an accurate sample of milk and the like. The collar 105 is adjusted to a position on the sampling tube 102 so that the distance from the bottom of float 101 to the bottom cap 108 is slightly less than the depth of the liquid sampled. The distance H between the surface of the liquid and the points of discharge 122 and 123 of the liquid into the collecting vessels 117 and 120, respectively, is not substantially greater than the distance between the orifices 103. When the sampling apparatus is empty of liquid, the bottom surface of the float 101 rests approximately on the surface of the liquid.

Because the tube 111 is vented to the atmosphere by flexible tube 121, liquid fills the sampling tube 102 by flowing through the orifices 103. At the same time, the flexible tube 110 fills with the liquid and the collecting vessel 117 begins to fill with the sample. After the vessel 117 is substantially filled, its ball valve 118 rises and closes off further flow into or out of vessel 117. Liquid then flows into vessel 120. At this time, the liquid flow conditions in the sampler are as follows. Because the discharge capacity of the T-branch 111 and the flow capacity of the sampling tube 102 is greater than the combined flow capacities of all of the orifices 103, the system remains full up to a line even with the points of discharge 122 and 123 into the collecting vessels. Hence, the approximate fluid pressure across each orifice 103 is the fluid head of the liquid depth H, the latter being the difference at any given point along the tube 102 between the fluid head outside the tube 102 and the fluid head inside the tube 102.

The sampling device of FIGS. 8–10 with its equally spaced apertures 103 of equal area is designed for sampling tanks of constant horizontal cross-section, e.g., rectilinear tanks, upstanding cylindrical tanks and the like. The spacing and/or area of the apertures 103 is changed for sampling tanks of nonuniform horizontal cross-section.

In the latter tanks, the sampling volume drawn off from each strata of the liquid can be controlled by one of two methods. In one instance, the sampling apertures or orifices 103 are placed closer together so that they sample a thinner strata of the liquid where the horizontal cross-sectional area of the tank is greater and a thicker strata of liquid where the horizontal cross-section of the tank is smaller. By proper adjustment of the distances between the orifices 103, each orifice will sample during a sampling period a strata in the liquid body which is substantially equal in volume to the volume of strata which the other orifices sample. For example, in sampling a cylindrical tank lying on its side, the orifices at the middle of the sampling tube will be closer together than the orifices at either end of the sampling tube because the depth of a given fractional volume is much less at the middle of the tank than the depth of the same fractional volume at the top or bottom of the tank.

The other method for sampling proper amounts from each strata is attained by using orifices in the tube of different cross-sectional areas so that the ratio of area of an orifice 103 at a given point of the tube 102 to the total areas of all of the orifices 103 is the same as the ratio of the volume of liquid in the strata sampled by that orifice during the sampling period to the total volume of liquid in the tank. In this case, the orifices 103 are usually, though not necessarily, equally spaced.

By using the flexible tube 110, the entire float and sampling assembly can be moved up and down on the tube 103 so that only a part of the tank can be sampled, if desired. When a tank is only partly filled, the sampling tube can be adjusted to obtain a proper sample by placing the float 101 in a position on the tube 102 where the float rests on top of the surface of the liquid with the bottom cap 108 just above the lowest point in the tank, e.g., about the distance between the orifices 103. This permits the sampling tube to sample the section of the tank for which its orifice spacing was designed.

The purpose in utilizing the two collecting vessels 117 and 120 is to eliminate error in liquid sampling because the first liquid drawn through the flexible conduit line from the sampling tube is not in proportion to the amount of liquid in each strata. During the initial operation in collecting the sample, the pressure difference across each orifice is not the same. The pressure difference at this stage is greater at the bottom orifices than at the upper orifices. Therefore, the first part of the liquid is collected in the vessel 117. When it is substantially filled, the ball float 118 closes off the vessel 117. This prevents liquid used to clear the system from mixing with liquid flowing to the vessel 120, in which is collected the true sample.

It is in accordance with the best practice of the invention to adjust the weight of the sampling assembly before it is filled with liquid so that it is just heavy enough, when it is in place in the liquid to be sampled, that the bottom of the float 101 is approximately on the surface of the liquid. The lower cap is just above the bottom of the tank, preferably a distance about equal to the distance between the orifices 103 (the smallest distance in the case where the orifices 103 do not have equal spacing). As the collection vessels 117 and 120 fill with the liquid, the sampling device, by virtue of its increased weight, moves downwardly in the liquid a small amount so that each orifice will move through the strata which it is designed to sample. In long tanks it is often desirable to draw the sampler from one end of the tank to the other as the sample is being taken to avoid any possibility of not properly sampling differences in composition from one end of the tank to the other. The flexible air vent tube is a convenient means for drawing the sampler from one end of the vessel to the other. If, in the process of sampling, the sampler operates at an angle to the vertical, it will still take in accurate samples.

The float 101 is not essential for all types of sampling operations. For example, it is possible to take a proper sample without using the float 101 where the sampler is used in only one location in the tank. In this case, the sampler can be placed in the tank and held in correct position for sampling by hand or by a mounting attachment. An embodiment of this type is shown in FIG. 13 where parts corresponding to those shown in the embodiment of FIGS. 8–10 have been designated by like numerals. The embodiment of FIG. 13 is the same in its lower part (not illustrated) as the embodiment of FIGS. 8–10 and differs in its upper part by the omission of the float 101, the use of a rubber cap 146 at the end of the conduit 111, and the replacement of the flexible air vent tube 121 with a pair of upstanding air vent tubes 147 and 148 mounted in the caps 119 and 116, respectively. These vents communicate with and vent vessels 120 and 117, respectively. They extend a few inches above the upper end of tube 102 so that they are above the liquid surface when the sampler is immersed. The unequal spacing of the apertures 103, as heretofore described, is shown in FIG. 13.

This embodiment of the invention is used where sampling is done at one location in the tank. It is held by hand at the top of the sampler tube 102. It is designed to reach the bottom of the tank and may be held firmly in place against the bottom during the sampling. It can, however, be moved up and down by hand over short distances during the sampling.

The modification of the invention shown in FIG. 11 can be used where a sampling tube of adjustable length is desired. In this instance, the sampling tube is made of a number of telescoping sections in which short lengths of tubing 130 telescope over other sections of tubing 131 and 132. The tubing 130 has an orifice 133 positioned at the midpoint of the tubing. The tubing 131 has an orifice 134 which is located just beyond the end of the tubing 130 when the tubes 131 and 132 are in approximate abutting contact. A similar orifice 135 is provided in the tube 132 just beyond th other end of the tube 130.

In order to avoid liquid seepage between the telescoping sections of the tubing, a pair of O-rings 136 and 137 are placed about the tubes 131 and 132. This type of construction can be used successfully only where the orifices are all of equal size. It has the advantage that the distance between the orifices can be adjusted so that the sampling tube can be adapted for different types of tanks or depths of liquids.

In FIG. 12, sampling tube 140 is mounted permanently on the tank 141. Its T-branch 142 extends through the wall of the tank 141 and contains a manually operated valve 143 of any suitable construction. The connecting tube 144, which again preferably is a flexible tube, is connected at one end of the T-branch 142 and at the other end to the dual vessel sample unit 145 of the type illustrated in FIGS. 8–10, and like numerals designate like parts. By using a flexible tube 144, then the distance H between the level at which the liquid is discharged into the collecting vessels and the surface of the liquid in the tank can be adjusted to any desired value not to exceed the distance between orifices. The permanently mounted sampling tube 110 of FIG. 12 operates in a manner similar to the floating sampler illustrated in FIGS. 8–10, except that the sampling orifices do not move downwardly through a strata during the sampling operation.

One accurate way for determining the proper distance between orifices is to add equal volumes of liquid in increments to the tank for which the sampler is designed. The level of the liquid is determined at points in which a predetermined volume of the liquid is added. An orifice is placed in the sampler tube at each of these determined liquid levels. A similar procedure is followed where the tube is designed to sample equal weight units by adding equal weight increments instead of equal volume increments.

Thus, in a 20,000 lb. tank a sampler with orifices placed at 1,000 lb. liquid level, increments would be sampled in 20 strata throughout the tank. Where it is desired to sample the tank in equal sections, e.g., every 3 inches, the weight of the liquid added at each 3-inch increment of liquid level in the tank is determined, and the area for the orifice at each particular level is determined as previously described whereby each orifice delivers its correct proportion of the liquid in its 3-inch section during the sampling period. The above figures and examples are only exemplary—it being obvious that other weight increments or height increments may be more advantageous for a given type of tank.

The embodiment of FIG. 13 is similar in most respects to the embodiment of FIG. 8 and, where applicable, like numerals are used to designate like parts. The essential difference between these embodiments lies in the structure for venting the sample collection vessels 117 and 120. In FIG. 13, the end of the tube 111 is closed by a cap 46 instead of being connected to a vent tube as is the case in FIG. 8. In FIG. 13, the collection vessels 117 and 120 are vented to the atmosphere by means of upstanding vent tubes 147 and 148 communicating at one end with the atmosephere and at the other end with the upper portions of the collection vessels.

The invention is hereby claimed as follows:

1. A fluid sampling device comprising a sampling tube having a plurality of small orifices in the tubular wall at predetermined intervals along the length of said tube, said tube adapted to be immersed in a body of liquid to be sampled, and means for withdrawing liquid from said tube and maintaining the level of sample liquid in said tube lower than but near the level of the body of liquid in which the tube is immersed during the sampling operation.

2. A device as claimed in claim 1 wherein said orifices are substantially equally spaced along the length of said tube, and said means for withdrawing liquid from said tube maintains said liquid in said tube at a level below the level of said body of said liquid substantially equal to the spacing between said orifices.

3. A fluid sampling device as claimed in claim 1, wherein said means comprises a second tube of substantially smaller outside diameter than the inside diameter of said sampling tube extending into one end of said sampling tube, and means in said sampling tube for venting said one end of said sampling tube to the atmosphere when the opposite end of said sampling tube and a portion of said second tube are immersed in a body of liquid to be sampled whereby said one end of said sampling tube remains in communication with the atmosphere when a vacuum is drawn on said second tube and whereby the level of the sample liquid in said sampling tube is maintained adjacent the open end of said portion of said second tube during the sampling of said liquid.

4. A fluid sampling device as claimed in claim 1, wherein said means comprises a second tube intercepting said sampling tube and adapted to convey sampled liquid from said sampling tube to a collection zone, a float mounted on said sampling tube, a vent tube intercepting and extending upwardly from said second tube from a point in said second tube below but near said float to a point above the level of a body of liquid in which said device is floating, and means for drawing a vacuum on said second tube.

5. A device as claimed in claim 4 wherein said vent tube is mounted in and extends through said float.

6. A fluid sampling device as claimed in claim 1 wherein said means comprises a drain tube having means to pivotally support its lower end in said tank, said sampling tube being mounted on and communicating with the upper end of said pivotally supported tube, a float mounted on said sampling tube at a point above but near the point of communication of said sampling tube and said pivotally supported tube, and means for venting the upper end of said sampling tube to the atmosphere, whereby the level of sample liquid in said sampling tube is maintained at said point of communication and thereby lower but near the level of the body of liquid in said tank during the sampling operation.

7. A fluid sampling device as claimed in claim 1, wherein said means comprises a flexible tube with one end connected to and communicating with said elongated tube intermediate the ends of the latter, a collar slidably mounted upon said elongated tube, locking means for fixedly positioning said collar on said elongated tube, a third tube mounted on said collar with its axis substantially transverse to the axis of said elongated tube, said third tube being connected to and communicating with the other end of said flexible tube, and a pair of liquid collection vessels communicating with and depending from said third tube, said collar being positioned on said elongated tube at a point wherein the level of the sample liquid in said elongated tube is lower but near the level of the body of liquid in which the sampling apparatus is immersed during the sampling operation.

8. The combination of claim 7 wherein one of said liquid collection vessels has a float valve adapted to close off its vessel from said third tube when said vessel is substantially filled with liquid.

9. A fluid sampling device as claimed in claim 1, wherein said means comprises a flexible tube with one end connected to and communicating with said elongated tube intermediate the ends of the latter, a collar slidably mounted upon said elongated tube, locking means for fixedly positioning said collar on said elongated tube, a third tube mounted on said collar with its axis substantially transverse to the axis of said elongated tube, said third tube being connected to and communicating with the other end of said flexible tube, a pair of liquid collection vessels communicating with and detachably depending from said third tube, a sleeve attached to said collar, said sleeve being slidable along said elongated tube with said collar, and a hollow float mounted on said sleeve above but near said third tube, said float being mounted about said elongated tube and movable along said elongated tube with said collar.

10. A fluid sampling device as claimed in claim 1, wherein said means comprises a flexible tube with one end connected to and communicating with said elongated tube intermediate the ends of the latter, a collar slidably mounted upon said elongated tube, locking means for fixedly positioning said collar on said elongated tube, liquid sample collection means mounted on said collar, said liquid sample collection means being connected to and communicating with the other end of said flexibe tube, a sleeve attached to said collar, said sleeve being slidable along said elongated tube with said collar, and a hollow float mounted on said sleeve above but near said collar, said float being mounted about said elongated tube and movable along said elongated tube with said collar.

11. The combination of claim 10 wherein said liquid sample collection means includes a first liquid collection vessel having a float valve adapted to close off said vessel when it is filled with liquid, and includes also a second liquid collection vessel adapted to be filled with liquid sample after said first vessel is filled with liquid.

12. A fluid sampling device comprising a sampling tube having a plurality of small orifices in the tubular wall at predetermined intervals along the length of said tube, said tube adapted to be immersed in a body of liquid to be sampled, fluid sample collection means, means communicating with said sampling tube for conveying liquid from said sample tube to said fluid sample collection means, means for venting the upper portion of said tube to the atmosphere, and means for maintaining the liquid level of liquid sample flowing in said sample tube at a level near but below the level of the liquid body in which said tube is immersed.

13. A liquid sampling device comprising a sampling tube with a plurality of small orifices longitudinally spaced in the tubular wall, a sample collection vessel mounted on said tube, liquid-conveying means communicating said tube and said vessel whereby liquid sampled by said tube may flow to said vessel, said vessel comprising wall means dividing said vessel into an upper chamber and a lower chamber, means communicating said upper and lower chambers, and means for admitting liquid conveyed by said liquid-conveying means into said upper chamber, whereby the initial portion of the sample collected in said vessel flows from said upper chamber into said lower chamber until it is filled and the reminder of the sample collected in said vessel is collected in, and maintained separate from, the initial portion of the sample collected in said lower chamber.

14. A liquid sampling device comprising a sampling tube with a plurality of small orifices longitudinally spaced in the tubular wall, a sample collection vessel mounted on said tube, liquid-conveying means communicating said tube and said vessel whereby liquid sampled by said tube may flow to said vessel, said vessel comprising wall means dividing said vessel into an upper chamber and a lower chamber, a tube mounted in said wall means, said tube extending into the lower portion of said lower chamber and communicating said upper and lower chambers, means venting the upper portion of said lower chamber, and means for admitting liquid conveyed by said liquid-conveying means into said upper chamber, whereby the initial portion of the sample collected in said vessel flows from said upper chamber into said lower cahmber until it is filled and the remainder of the sample collected in said vessel is collected in, and maintained separate from, the initial portion of the sample collected in said lower chamber.

15. A liquid sample collection vessel comprising a vessel, wall means dividing said vessel into an upper and a lower chamber, a tube mounted in said wall means, said tube extending from said wall means into the lower portion of said lower chamber and communicating said chambers, means for venting the upper portion of said lower chamber, and means for admitting liquid to be collected said upper chamber.

16. A liquid sample collection vessel as claimed in claim 15 wherein said wall means has a second tube mounted therein, said second tube extending from said wall means into the upper portion of said upper chamber and communicating the upper portions of said upper and lower chambers, whereby said lower chambers, whereby said lower chamber is vented into the upper portion of said upper chamber, and means for venting the upper portion of said upper chamber.

17. A liquid sample collection vessel as claimed in claim 15 wherein said vessel has a tube extending longitudinally through said vessel, said tube having an opening located in the upper portion of said upper chamber, through which opening liquid sample is admitted into said vessel.

18. A liquid sample collection vessel as claimed in claim 17 wherein said tube has a second opening therein located near the bottom of said lower chamber, and valve means for selectively opening and closing said second opening.

19. A liquid sample collection vessel as claimed in claim 17 wherein said tube has a second opening therein located near the bottom of said lower chamber, a hollow sleeve slidably mounted against the inner surface of said tube, and means for slidably actuating said sleeve into blocking and nonblocking relationship with said second opening to provide valve means for selectively opening and closing said second opening.

20. A liquid sampling apparatus comprising an elongated tube with a plurality of apertures spaced in the wall of said tube along the length thereof, a flexible tube with one end connected to and communicating with said elongated tube intermediate ends of the latter, a liquid sample collection means movable in a direction longitudinally of said elongated tube, and said liquid sample collection means being connected to and communicating with the other end of said flexible tube.

21. The combination of claim 20 wherein said elongated tube is made up of telescoping tubular sections with at least one of said apertures in each of said telescoping sections.

22. The combination of claim 20 wherein said elongated tube is fixedly mounted in a vertical position in a tank adapted to hold a liquid and said tube has a horizontal tube connected to and communicating with said elongated tube, said horizontal tube extending through a side wall of said vessel, a valve in said horizontal tube, and said one end of said flexible tube is connected to said horizontal tube.

23. A liquid sampling apparatus for sampling a tank of nonuniform horizontal cross-sectional area comprising an elongated tube with a plurality of orifices of substantially equal cross-sectional area spaced apart at nonuniform distances along the length thereof, said orifices being spaced so that each orifice samples in said tank of nonuniform horizontal cross-sectional area, at substantially equal rates of flow through said orifices, a stratum of liquid which is substantially equal in volume to the volumes of strata of said liquid which the other of said orifices sample.

24. A process for sampling a body of milk of nonuniform horizontal cross-sectional area which comprises drawing at nonuniform spaced points samples of milk from horizontal strata from top to bottom of said body of milk at substantially equal volumes of flow of the milk at said spaced points, said points sampling strata in said body of milk of substantially equal volume, and collecting the samples drawn at said spaced points to obtain a representative average sample of said body of milk.

25. A process as claimed in claim 22 wherein the uppermost of said points is substantially even with the upper level of said liquid and wherein the next to uppermost of said points is substantially even with the level at which said sample is collected.

26. A free-floating, liquid sampling apparatus comprising an elongated sampler tube with a plurality of orifices spaced in the wall of said tube along the length thereof, a hollow float mounted on one end of said tube, means closing the other end of said tube, liquid sample collecting means mounted on said tube adjacent to said one end, tube means communicating said sampler tube and said liquid sample collecting means for conveying liquid sample from said sampling tube to said collecting means, and means for venting said liquid sample collecting means to the atmosphere above a body of liquid when said tube and said liquid sample collecting means are submerged in the body of liquid.

27. A sampling apparatus as claimed in claim 26 wherein said means for venting is a flexible tube connected to and communicating with said liquid sample collecting means.

References Cited by the Examiner
UNITED STATES PATENTS

| | | | |
|---|---|---|---|
| 1,603,712 | 10/1926 | Peck | 73—425.4 |
| 2,238,677 | 4/1941 | Collins | 73—421 |
| 2,934,959 | 5/1960 | Johnson | 73—422 |

LOUIS R. PRINCE, *Primary Examiner.*

RICHARD QUEISSER, *Examiner.*

UNITED STATES PATENT OFFICE
CERTIFICATE OF CORRECTION

Patent No. 3,247,721                      April 26, 1966

Julius Theodore Johnson

It is hereby certified that error appears in the above numbered patent requiring correction and that the said Letters Patent should read as corrected below.

Column 13, line 17, strike out "whereby said lower chambers,".

Signed and sealed this 1st day of August 1967.

(SEAL)
Attest:

EDWARD M. FLETCHER, JR.
Attesting Officer

EDWARD J. BRENNER
Commissioner of Patents